(12) United States Patent
Li

(10) Patent No.: US 12,382,421 B2
(45) Date of Patent: Aug. 5, 2025

(54) POSITIONING MEASUREMENT METHOD, POSITIONING MEASUREMENT APPARATUS AND STORAGE MEDIUM

(71) Applicant: Beijing Xiaomi Mobile Software Co., Ltd., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 468 days.

(21) Appl. No.: 18/012,117

(22) PCT Filed: Jul. 23, 2020

(86) PCT No.: PCT/CN2020/103861
§ 371 (c)(1),
(2) Date: Dec. 21, 2022

(87) PCT Pub. No.: WO2022/016465
PCT Pub. Date: Jan. 27, 2022

(65) Prior Publication Data
US 2023/0180175 A1 Jun. 8, 2023

(51) Int. Cl.
*H04W 64/00* (2009.01)
*H04W 84/12* (2009.01)

(52) U.S. Cl.
CPC ............ *H04W 64/00* (2013.01); *H04W 84/12* (2013.01)

(58) Field of Classification Search
CPC ... H04W 84/12; H04W 4/023; H04W 64/006; H04W 64/00; H04W 4/029; H04W 4/80; H04W 4/02; H04W 4/021; H04W 24/10; H04W 92/18; H04W 4/025; H04W 84/045; H04W 16/32; H04W 64/003; H04W 48/18; H04W 52/0245; H04W 88/02; H04W 12/06; H04W 16/18; H04W 36/322;
(Continued)

(56) References Cited

U.S. PATENT DOCUMENTS

2014/0066094 A1* 3/2014 Siomina ................ H04W 64/00
455/456.2
2016/0037301 A1* 2/2016 Davydov ................ H04W 4/90
455/456.1
(Continued)

FOREIGN PATENT DOCUMENTS

CN 102547974 A 7/2012
CN 106538004 A 3/2017
(Continued)

*Primary Examiner* — Nimesh Patel
(74) *Attorney, Agent, or Firm* — Volpe Koenig

(57) ABSTRACT

A positioning measurement method is performed by a terminal, and includes: obtaining first configuration information and second configuration information, where the first configuration information is configured to indicate the terminal to perform positioning measurement based on a first positioning signal transmitted between the terminal and a first type positioning node, and the second configuration information is configured to indicate the terminal to perform positioning measurement based on a second positioning signal transmitted between the terminal and a second type positioning node; and performing positioning measurement based on the first configuration information and the second configuration information.

20 Claims, 13 Drawing Sheets

(58) Field of Classification Search
CPC ... H04W 52/245; H04W 8/245; H04W 12/64; H04W 16/00; H04W 16/24; H04W 16/26; H04W 36/30; H04W 36/0061; H04W 12/63; H04W 88/06; H04W 24/02; H04W 60/04; H04W 16/20; H04W 40/248; H04W 88/08; H04W 48/20; H04W 36/302; H04W 72/54; H04W 36/0058; H04W 36/0085; H04W 36/0094; H04W 36/304; H04W 36/00835; H04W 52/0209; H04W 52/0212; H04W 84/005; H04W 24/04; H04W 84/042; H04W 4/20; H04W 36/326; H04W 40/12; G01S 5/0263; G01S 5/02; G01S 11/06; G01S 5/0236; G01S 5/10; G01S 5/14; G01S 5/0027; G01S 5/0036; G01S 11/02; G01S 5/0294; G01S 19/46; G01S 5/0284; G01S 5/0244; G01S 19/42; G01S 2205/008; G01S 5/0249; G01S 5/011; G01S 5/01; G01S 11/04; G01S 13/04; G01S 5/0295; G01S 19/21; G01S 19/45; G01S 5/0009; G01S 5/0268; G01S 5/02955; Y02D 30/70; H04B 17/318; H04B 17/309; H04B 17/27; H04B 1/7097; H04B 17/253; H04B 17/345; H04B 7/0408; H04B 7/0413; H04B 17/327; H04B 17/336; H04B 7/15521; H04B 1/7083; H04B 17/252; H04B 17/382; H04H 20/57; H04H 20/72; H04H 60/91; H04L 67/51; H04L 1/20; H04L 12/5692; H04J 11/0069; H04J 11/0093; H04M 15/765; H04M 15/8033; H04M 2215/7435; H04K 2203/16; H04K 2203/18

See application file for complete search history.

(56) References Cited

U.S. PATENT DOCUMENTS

| | | | | |
|---|---|---|---|---|
| 2017/0195932 | A1* | 7/2017 | McDiarmid | H04W 36/26 |
| 2018/0091939 | A1* | 3/2018 | Venkatraman | H04W 4/021 |
| 2019/0052996 | A1* | 2/2019 | Sahai | H04W 24/10 |
| 2019/0261303 | A1* | 8/2019 | Wei | H04W 64/00 |

FOREIGN PATENT DOCUMENTS

| | | |
|---|---|---|
| CN | 110012536 A | 7/2019 |
| CN | 110381526 A | 10/2019 |
| CN | 110958630 A | 4/2020 |
| CN | 111264068 A | 6/2020 |
| CN | 111417189 A | 7/2020 |

* cited by examiner

POSITIONING MEASUREMENT METHOD, POSITIONING MEASUREMENT APPARATUS AND STORAGE MEDIUM

CROSS REFERENCE TO RELATED APPLICATION

The present application is a U.S. National Stage of International Application No. PCT/CN2020/103861, filed on Jul. 23, 2020, the contents of all of which are incorporated herein by reference in their entireties for all purposes.

BACKGROUND

With the development of communication technologies, positioning measurement through wireless signals has been applied. A terminal and wireless network device that support a positioning function may more conveniently perform positioning measurement on a location of the terminal.

SUMMARY

According to a first aspect of embodiments of the present disclosure, a positioning measurement method is provided and performed by a terminal, and includes: obtaining first configuration information and second configuration information, where the first configuration information is configured to indicate the terminal to perform positioning measurement based on a first positioning signal transmitted between the terminal and a first type positioning node, and the second configuration information is configured to indicate the terminal to perform positioning measurement based on a second positioning signal transmitted between the terminal and a second type positioning node; and performing positioning measurement based on the first configuration information and the second configuration information.

According to a second aspect of the embodiment of the present disclosure, a positioning measurement method is provided and performed by network device, and includes: sending first configuration information which is configured to indicate a terminal to perform positioning measurement based on a first positioning signal transmitted between the terminal and a first type positioning node, where the number of the first type positioning node is determined based on the number of a second type positioning node, and the second type positioning node are positioning nodes that transmit a second positioning signal with the terminal.

According to a third aspect of the examples of the present disclosure, a positioning measurement apparatus is provided, and includes a processor; and a memory for storing processor-executable instructions. The processor is configured to: execute the positioning measurement method in the first aspect or in any implementation manner of the first aspect.

According to a fourth aspect of the examples of the present disclosure, a positioning measurement apparatus is provided, and includes a processor; and a memory for storing processor-executable instructions. The processor is configured to: execute the positioning measurement method in the second aspect or in any implementation manner of the second aspect.

It should be understood that the above general description and the following detailed description are only exemplary and explanatory, and cannot limit the present disclosure.

BRIEF DESCRIPTION OF THE DRAWINGS

The accompanying drawings, which are incorporated in and constitute a part of this specification, illustrate the embodiments consistent with the present disclosure and, together with the specification, serve to explain the principles of the disclosure.

DETAILED DESCRIPTION

Figure 1:
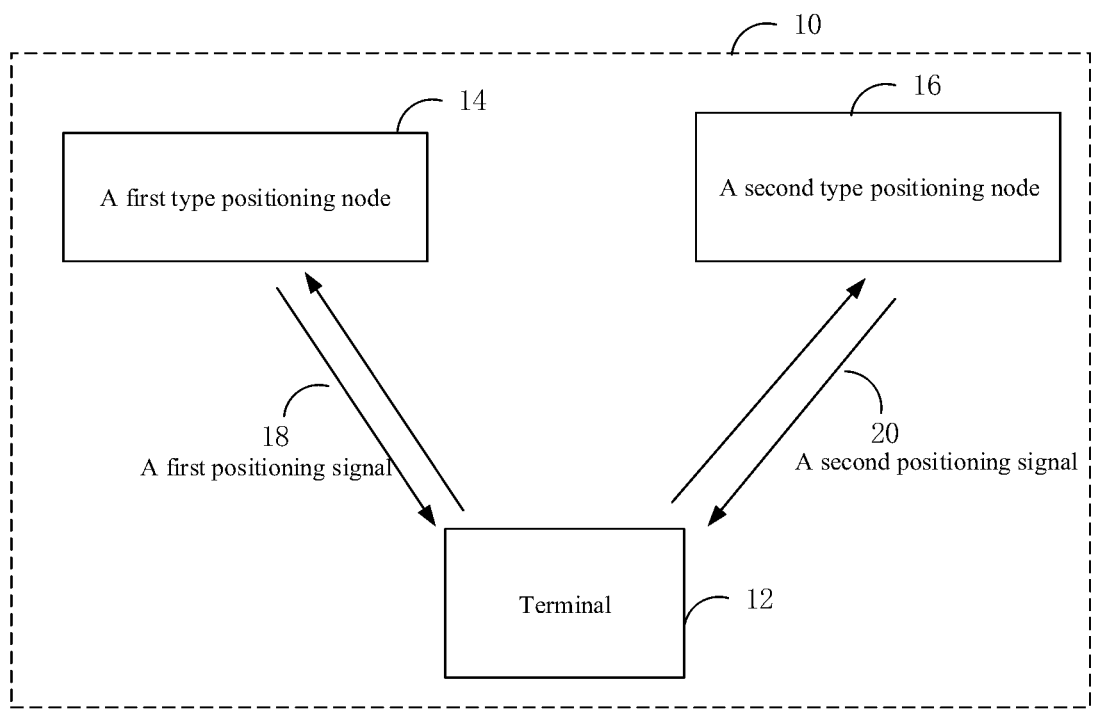
FIG. 1 is a system architecture diagram of joint positioning measurement according to an example.

The description will here be made in detail to examples, instances of which are illustrated in the accompanying drawings. When the following descriptions relates to the accompanying drawings, the same numbers in different accompanying drawings indicate the same or similar elements, unless otherwise indicated. The implementation modes described in the following examples do not represent all implementation modes consistent with examples of the disclosure. On the contrary, they are merely examples of apparatuses and methods consistent with some aspects of the examples of the disclosure as described in detail in the appended claims.

The present disclosure relates to the technical field of communication, and particularly to a positioning measurement method, a positioning measurement apparatus, and a storage medium.

In the related art, the terminal communicates with wireless network device such as wireless access device and core network device based on a cellular network, and may realize a positioning measurement function. For example, in 5G New Radio Release 16 (NR Rel-16), positioning measurement for a terminal in a connected state is mainly discussed, and reference signals used for positioning are defined. The reference signals used for positioning may include, for example, positioning reference signals (PRSs) used for downlink positioning and sounding reference signals (SRSs) used for uplink positioning. Positioning measurement includes terminal measurement and wireless network device measurement, and the measurement value includes a signal intensity measurement value, a signal transmission time value and an angle value of channel arrival or departure.

In order to realize positioning measurement, the terminal needs to transmit reference signals for a positioning purpose with a plurality of wireless network devices (such as base stations/transmission reception points (TRPs), etc.). In an example, in the case of downlink, the terminal needs to receive and measure PRSs sent by the plurality of base stations/TRPs. In the case of uplink, the terminal needs to send SRSs to the plurality of base stations/TRPs. The PRSs and SRSs occupy a large bandwidth and require high transmission power, so that power consumption of the terminal is influenced, and at the same time, other normal communication transmission cannot be performed while the positioning reference signals are sent, so that normal communication of a whole system is influenced.

In related art, in addition to positioning by virtue of a cellular network, there are many other positioning methods, such as a positioning method based on a wireless local area network terminals (WLAN terminal). Positioning based on the WLAN terminal mainly refers to that the terminal performs measurement by reference signals for positioning between the terminal and a plurality of WLAN terminals, and obtains a location of the terminal based on measurement results and positions of the WLAN terminals. The WLAN terminals are close to the terminal, so that if the terminal sends the uplink reference signals for positioning, transmission power of the terminal does not need to be too high, and therefore, power consumption of the terminal can be reduced, and interference on other terminals is reduced, and normal communication of the other terminals is not influenced.

In view of this, the embodiments of the present disclosure provide a positioning measurement method, in the positioning measurement method, the reference signals for the positioning purpose (hereinafter referred to as positioning signals) transmitted between the terminal and the different types of positioning nodes are combined. Based on this, power consumption influence of positioning measurement performed based on one type of positioning nodes solely is reduced, and communication performance of a communication system is improved.

It may be understood that, the positioning nodes involved in the embodiments of the present disclosure may also be called positioning device, or network device, or wireless network device.

In an example, a positioning method combining a cellular network with a WLAN network is provided. For example, the terminal may transmit reference signals for a positioning purpose by virtue of a base station/TRP and a plurality of WLAN terminals, measure, and calculate a location of the terminal according to measurement results and positions of the base station/TRP and the plurality of WLAN terminals, so that influence of positioning on power consumption of the terminal, and influence on normal communication of a cellular network system are reduced.

The terminal involved in the present disclosure may also be called terminal device, user equipment (UE), a mobile station (MS), a mobile terminal (MT), etc., and is a device that provides voice and/or data connectivity to users, for example, the terminal may be handheld device with a wireless connection function, on-board device, Internet of Things (IoT) device, Industry Internet of Things (IIoT) device, etc. At present, some examples of the terminal are as follows: a mobile phone, a pocket personal computer (PPC), a palm computer, a personal digital assistant (PDA), a notebook computer, a tablet computer, wearable device, or on-board device. In addition, for an Internet of Vehicles (V2X) communication system, the terminal device may also be on-board device. It should be understood that, the examples of the present disclosure do not limit a specific technology and a specific device form which are adopted by the terminal.

In the examples of the present disclosure, for convenience of description, at least two types of positioning nodes among different types of positioning nodes (or device) used in joint positioning measurement are called the first type positioning node and the second type positioning node. The positioning signals transmitted for realizing positioning measurement through communication between the terminal and the first type positioning node are called a first positioning signal, and the positioning signals transmitted for realizing positioning measurement through communication between the terminal and the second type positioning node are called a second positioning signal.

In the examples of the present disclosure, the first type positioning node and the second-type nodes communicate with the terminal respectively by using different wireless access technologies. In an example, the first type positioning node include wireless network device communicating based on a cellular network, for example, the first type positioning node may include wireless access network device such as base stations, or include core network device such as location management function (LMF). Further, the wireless access network device involved in the present disclosure may be include: base stations, evolved nodes B (base stations), home base stations, access points (APs) in a wireless fidelity (WIFI) system, wireless relay nodes, wireless backhaul nodes, transmission points (TPs) or transmission and reception points (TRPs), etc., and the wireless access network device may also be gNodeB (gNB) in a NR system, or components or part of device constituting base stations. It should be understood that, in the examples of the present disclosure, a specific technology and a specific device form which are adopted by the network device are not limited.

For a device-to-device communication (D2D) system and an Internet of Vehicles (V2X) communication system, the first type positioning node may also be terminals, such as on-board device.

In the examples of the present disclosure, the second type positioning node include wireless local area network device communicating based on a WLAN, or Bluetooth device based on Bluetooth communication, or UWB device based on ultra-wideband (UWB) communication. It may be understood that the second type positioning node may also be sensors communicating based on one or more wireless communication technologies of WLAN, Bluetooth and UWB.

The positioning measurement method provided in the examples of the present disclosure may be applied to a system architecture 10 shown in FIG. 1. As shown in FIG. 1, the first positioning signal 18 is transmitted between the terminal 12 and the first type positioning node 14, and the second positioning signal 20 is transmitted between the terminal 12 and the second type positioning node 16. There is no communication interface between the first type positioning node 14 and the second type positioning node 16, that is, communication networks for communication between the first type positioning node 14 and the second type positioning node 16 are completely independent. In an example, positioning measurement is performed by combining a cellular network with a WLAN network, and an interface between the cellular network and the WLAN network is not provided, that is, the cellular network and the WLAN are completely independent.

In an example of the present disclosure, the first type positioning node is one or more base stations and/or one or more location management function entities, and the second type positioning node includes at least one of WLAN terminals, Bluetooth nodes, or UWB nodes.

Figure 2:
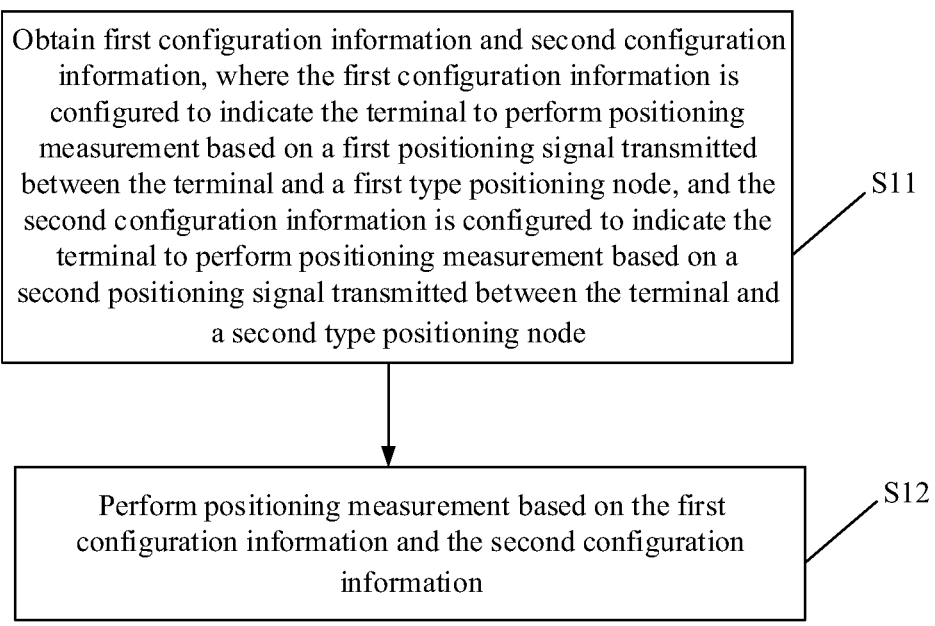
FIG. 2 is a flowchart of a positioning measurement method according to an example.

FIG. 2 is a flowchart of a positioning measurement method according to an example, and as shown in FIG. 2, the positioning measurement method is performed by a terminal, and includes the following steps.

In step S11, first configuration information and second configuration information are obtained.

The first configuration information is configured to indicate the terminal to perform positioning measurement based on a first positioning signal transmitted between the terminal and a first type positioning node. The second configuration information is configured to indicate the terminal to perform positioning measurement based on a second positioning signal transmitted between the terminal and a second type positioning node.

In step S12, positioning measurement is performed based on the first configuration information and the second configuration information.

In the embodiments of the present disclosure, joint positioning measurement is performed by combining the first positioning signal transmitted between the terminal and the first type positioning node with the second positioning signal transmitted between the terminal and the second type positioning node, so that power consumption influence of positioning measurement performed based on one type of positioning nodes solely is reduced, and communication performance of a communication system is improved.

In an example, suppose a terminal originally needs to perform transmission and measurement for a first positioning signal between the terminal and H first type positioning nodes to perform positioning measurement, by applying the terminal in the embodiments of the present disclosure, transmission and measurement for the first positioning signal with M first type positioning nodes, and transmission and measurement for the second positioning signal with N second type positioning nodes may be performed, where M+N=H. M is less than H. Through the joint positioning method provided by the examples of the present disclosure, relative to positioning measurement performed based on the H first type positioning nodes, positioning measurement performed based on the M first type positioning nodes may reduce influence of positioning on power consumption of the terminal when positioning measurement is performed based on the first type positioning node, and meanwhile, signaling overhead between the first type positioning node and the terminal is reduced.

In the embodiments of the present disclosure, the positioning measurement method involved in the above examples is described below in combination with practical applications.

In an example, the first configuration information in the embodiments of the present disclosure is sent by the first type positioning node or the location management function entity. When the first configuration information is sent by the first type positioning node, the first configuration information is sent by the first type positioning node to which a service cell of the terminal belongs.

In the embodiments of the present disclosure, the first type positioning node include wireless network devices (such as base stations or TRPs) communicating based on a cellular network, where the number of the wireless network device may be M. The first configuration information is used for configuring transmission and measurement for positioning signals (PRSs and/or SRSs) between the terminal and the wireless network device (such as base stations or TRPs).

Figure 3:
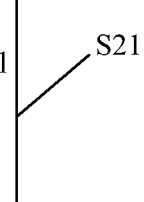
FIG. 3 is a flowchart of a positioning measurement method according to an example.

FIG. 3 is a flowchart of a positioning measurement method according to an example, as shown in FIG. 3, the positioning measurement method is performed by network device, where the network device may be a first type positioning node, or may be a location management function entity, and the positioning measurement method includes step 21.

In step S21, first configuration information is sent. The first configuration information is configured to indicate a terminal to perform positioning measurement based on a first positioning signal transmitted between the terminal and a first type positioning node, the number of the first type positioning node is determined based on the number of a second type positioning node, and the second type positioning node are positioning nodes that transmit a second positioning signal with the terminal.

In an example of the embodiments of the present disclosure, the second configuration information is sent by the second type positioning node.

The second type positioning node in the embodiments of the present disclosure include at least one of WLAN terminals, Bluetooth nodes, or UWB nodes. The number of the second type positioning node may be N. The second configuration information is used for configuring transmission and measurement for the second positioning signal between the terminal and at least one of WLAN terminals, Bluetooth nodes, or UWB nodes.

In the embodiments of the present disclosure, the terminal performing positioning measurement according to the first configuration information and the second configuration information may be understood as including transmission and measurement for the first positioning signal and the second positioning signal.

Positioning measurement of the terminal for the first configuration information and the second configuration information includes at least one of signal intensity measurement, time measurement or angle measurement. The measurement result includes at least one of a signal intensity measurement result, a time measurement result or an angle measurement result.

In an example, the terminal determines a first measurement result and a second measurement result. The first measurement result corresponds to a measurement result obtained by measuring with regard to the first positioning signal. The second measurement result corresponds to a measurement result obtained by measuring with regard to the second positioning signal.

In the embodiments of the present disclosure, the location of the terminal may be determined by the terminal through calculation, or may be determined by the first type positioning node through calculation, or may be determined by the second type positioning node through calculation.

In an example of the examples of the present disclosure, while calculating and determining the location of the terminal, the terminal calculates and determines the location of the terminal based on the first measurement result and the second measurement result.

In the embodiments of the present disclosure, while calculating and determining the location of the terminal, the terminal needs to determine location information of the first type positioning node and location information of the second type positioning node, and calculate and determine the location of the terminal based on the first measurement result, the second measurement result, the location information of the first type positioning node, and the location information of the second type positioning node.

In the examples of the present disclosure, the location information of the first type positioning node may be included in the first configuration information. And/or, the location information of the second type positioning node may be included in the second configuration information.

Figure 4:
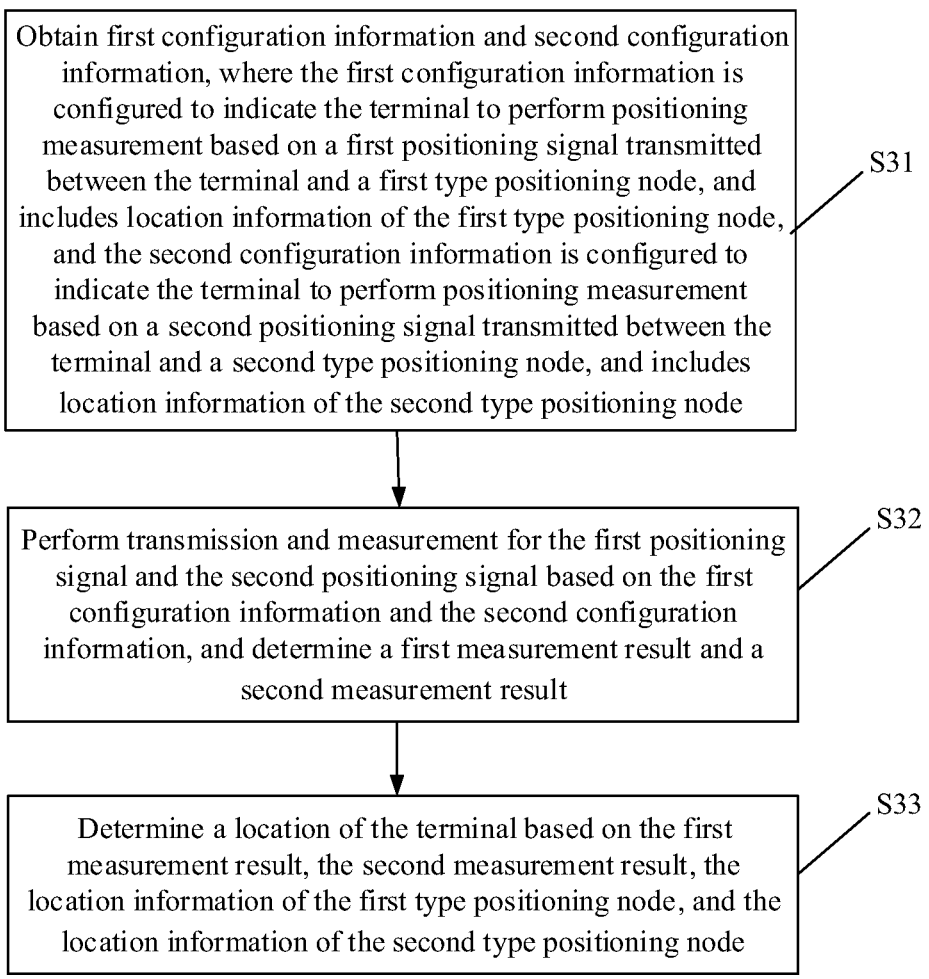
FIG. 4 is a flowchart of a positioning measurement method according to an example.

FIG. 4 is a flowchart of a positioning measurement method according to an example, and as shown in FIG. 4, the positioning measurement method is performed by a terminal, and includes the following steps.

In step S31, first configuration information and second configuration information are obtained.

The first configuration information is configured to indicate the terminal to perform positioning measurement based on a first positioning signal transmitted between the terminal and a first type positioning node, and the first configuration information includes location information of the first type positioning node. The second configuration information is configured to indicate the terminal to perform positioning measurement based on a second positioning signal transmitted between the terminal and a second type positioning node, and the second configuration information includes location information of the second type positioning node.

In step S32, transmission and measurement for the first positioning signal and the second positioning signal are performed based on the first configuration information and the second configuration information, and a first measurement result and a second measurement result are determined.

In step S33, the location of the terminal is calculated and determined based on the first measurement result, the second measurement result, the location information of the first type positioning node, and the location information of the second type positioning node.

In another implementation manner, the terminal in the embodiments of the present disclosure may send the first positioning measurement result and the second positioning measurement result to the first type positioning node and/or the location management function entity, and the location of the terminal is determined by the first type positioning node and/or the location management function entity.

When the first type positioning node and/or the location management function entity calculate and determine the location of the terminal, the location information of the second type positioning node further needs to be obtained. In the embodiments of the present disclosure, the terminal may communicate with the second type positioning node, obtain the location information of the second type positioning node, and send the location information of the second type positioning node to the first type positioning node or the location management function entity.

In the embodiments of the present disclosure, the location information of the second type positioning node may be included in the second configuration information.

The terminal sending the first measurement result and the second measurement result to the first type positioning node may be understood as sending to the first type positioning node to which a service cell of the terminal belongs.

Figure 5:
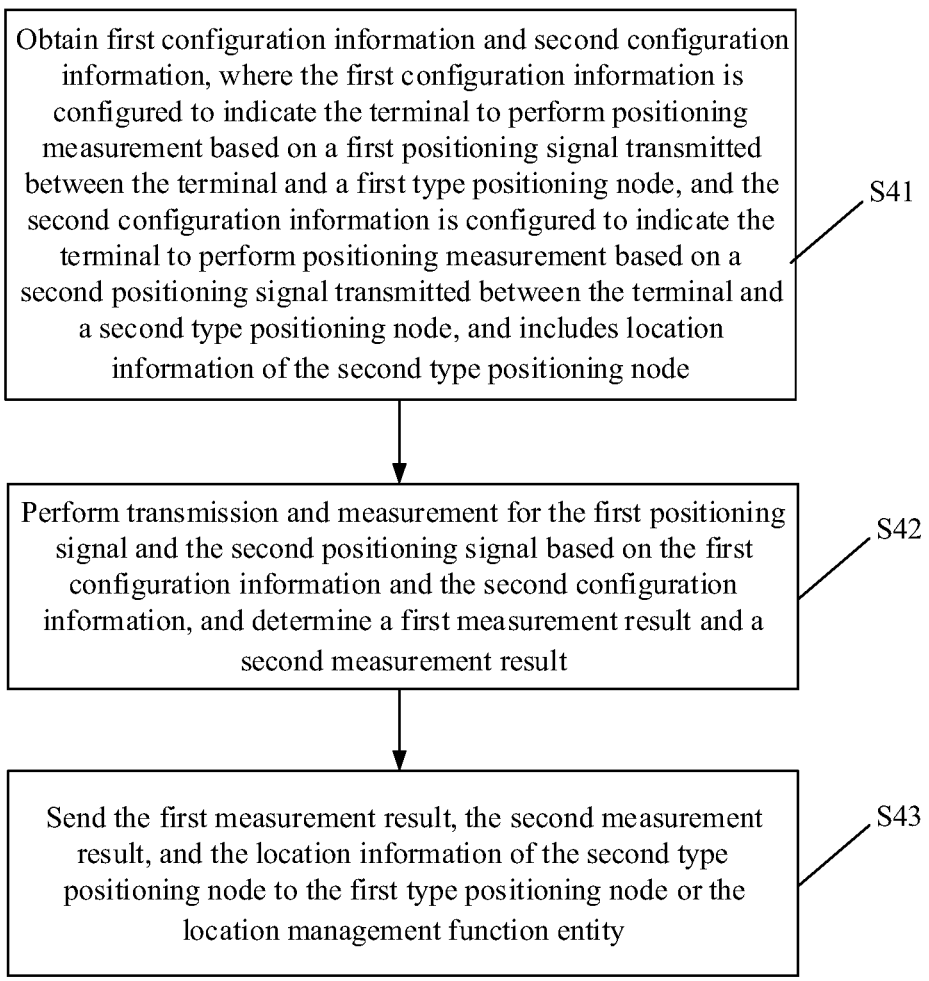
FIG. 5 is a flowchart of a positioning measurement method according to an example.

FIG. 5 is a flowchart of a positioning measurement method according to an example, and as shown in FIG. 5, the positioning measurement method is performed by a terminal, and includes the following steps.

In step S41, first configuration information and second configuration information are obtained. The first configuration information is configured to indicate the terminal to perform positioning measurement based on a first positioning signal transmitted between the terminal and a first type positioning node. The second configuration information is configured to indicate the terminal to perform positioning measurement based on a second positioning signal transmitted between the terminal and a second type positioning node, and the second configuration information includes location information of the second type positioning node.

In step S42, transmission and measurement for the first positioning signal and the second positioning signal are performed based on the first configuration information and the second configuration information, and a first measurement result and a second measurement result are determined.

In step S43, the first measurement result, the second measurement result, and the location information of the second type positioning node are sent to the first type positioning node or the location management function entity.

In the embodiments of the present disclosure, the second configuration information includes the location information of the second type positioning node, and the terminal sends the first measurement result, the second measurement result, and the location information of the second type positioning node to the first type positioning node or the location management function entity. The first type positioning node or the location management function entity obtain the first measurement result, the second measurement result, and the location information of the second type positioning node, and determine the location of the terminal based on the first measurement result, the second measurement result, the location information of the first type positioning node, and the location information of the second type positioning node.

The terminal sending the first measurement result, the second measurement result, and the location information of the second type positioning node to the first type positioning node may be understood as sending to the first type positioning node to which a service cell of the terminal belongs.

Figure 6:
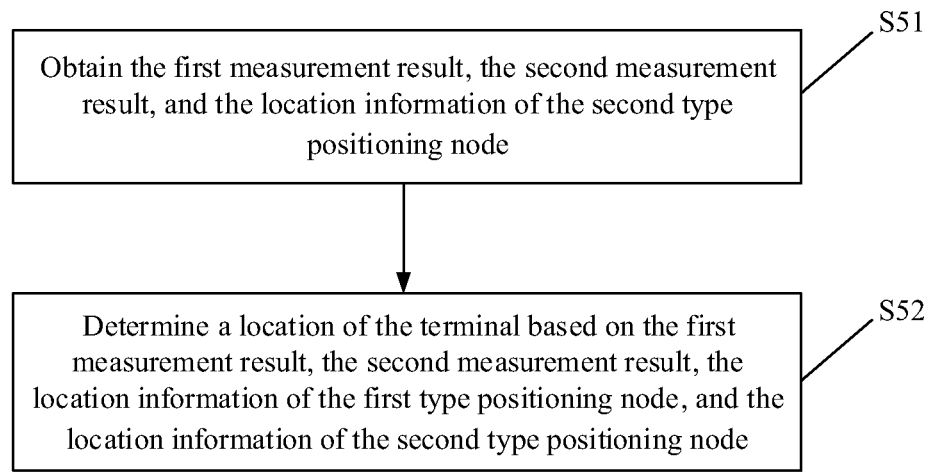
FIG. 6 is a flowchart of a positioning measurement method according to an example.

FIG. 6 is a flowchart of a positioning measurement method according to an example. As shown in FIG. 6, the positioning measurement method is performed by network device, the network device may be a first type positioning node or a location management function entity, and the positioning measurement method includes the following steps.

In step S51, a first measurement result, a second measurement result, and location information of the second type positioning node are obtained.

In step S52, the location of the terminal is calculated and determined based on the first measurement result, the second measurement result, the location information of the first type positioning node, and the location information of the second type positioning node.

In the embodiments of the present disclosure, if the network device is the first type positioning node, when the location management function entity calculate and determine the location of the terminal, the first type positioning node obtain the first measurement result, the second measurement result, and the location information of the second type positioning node, and send the obtained first measurement result, second measurement result, and location information of the second type positioning node to the location management function entity. Then the location management function entity calculate and determine the location of the terminal based on the first measurement result, the second measurement result, the location information of the first type positioning node, and the location information of the second type positioning node. The first type positioning node may further send the location information of the first type positioning node to the location management function entity.

It may be understood as that the first type positioning node to which a service cell of the terminal belongs obtain the first measurement result, the second measurement result, and the location information of the second type positioning node, and send the first measurement result, the second measurement result, and the location information of the second type positioning node to the location management function entity.

In the embodiments of the present disclosure, after determining the location of the terminal, the first type positioning node or the location management function entity may send the terminal location information that represents the determined location of the terminal to the terminal, and the terminal obtains the terminal location information sent by the first type positioning node or the location management function entity.

In another implementation, the terminal in the embodiments of the present disclosure may send the first positioning measurement result and the second positioning measurement result to the second type positioning node, and the location of the terminal is determined by the second type positioning node.

While determining the location of the terminal, the second type positioning node further need to obtain the location information of the first type positioning node. In the embodiments of the present disclosure, the terminal may communicate with the first type positioning node, obtain the location information of the first type positioning node, and send the location information of the first type positioning node to the second type positioning node.

In the embodiments of the present disclosure, the location information of the first type positioning node may be included in the first configuration information.

Figure 7:
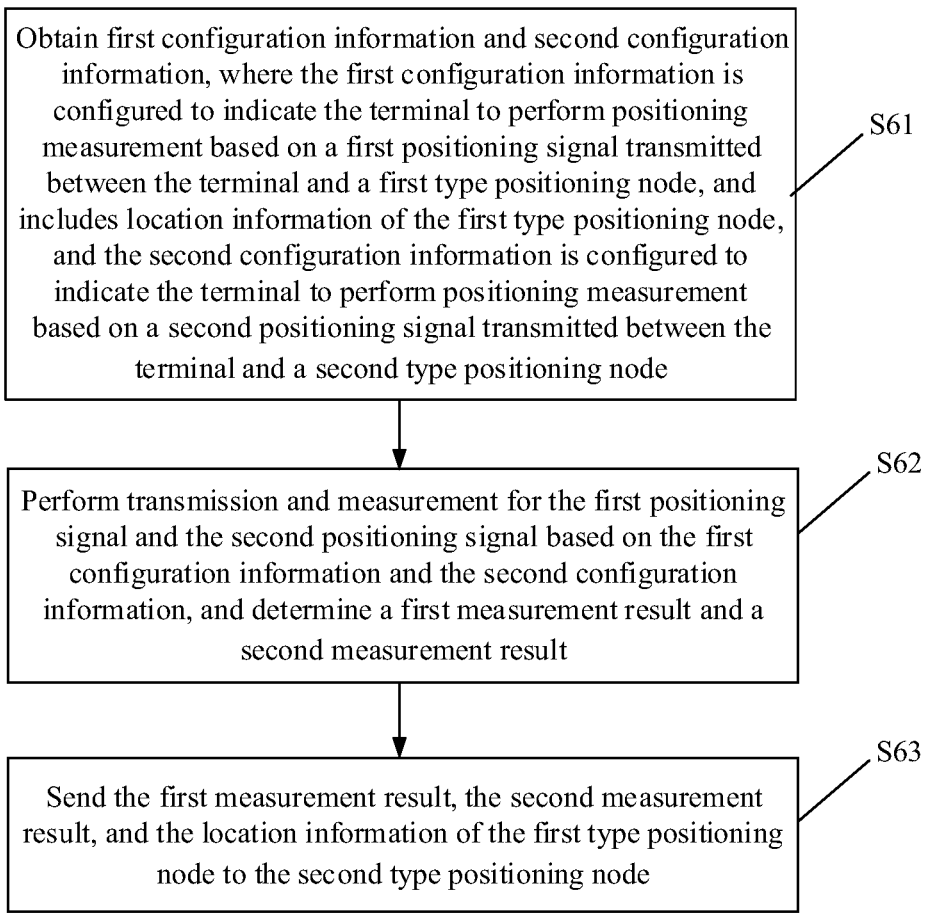
FIG. 7 is a flowchart of a positioning measurement method according to an example.

FIG. 7 is a flowchart of a positioning measurement method according to an example, and as shown in FIG. 7, the positioning measurement method is performed by a terminal, and includes the following steps.

In step S61, first configuration information and second configuration information are obtained. The first configuration information is configured to indicate the terminal to perform positioning measurement based on a first positioning signal transmitted between the terminal and a first type positioning node, and the first configuration information includes location information of the first type positioning node. The second configuration information is configured to indicate the terminal to perform positioning measurement based on a second positioning signal transmitted between the terminal and a second type positioning node.

In step S62, transmission and measurement for the first positioning signal and the second positioning signal are performed based on the first configuration information and the second configuration information, and a first measurement result and a second measurement result are determined.

In step S63, a first measurement result, a second measurement result, and the location information of the first type positioning node are sent to the second type positioning node.

In the embodiments of the present disclosure, the first configuration information includes the location information of the first type positioning node, and the terminal sends the first measurement result, the second measurement result, and the location information of the first type positioning node to the second type positioning node. The second type positioning node obtain the first measurement result, the second measurement result, and the location information of the first type positioning node, and determine the location of the terminal based on the first measurement result, the second measurement result, the location information of the first type positioning node, and the location information of the second type positioning node.

In the embodiments of the present disclosure, after determining the location of the terminal, the second type positioning node may send the terminal location information that represents the determined location of the terminal to the terminal, and the terminal obtains the terminal location information sent by the second type positioning node.

A determination process for the number of the first type positioning node used for positioning measurement, and the number of the second type positioning node used for positioning measurement will be described below in the examples of the present disclosure.

In the embodiments of the present disclosure, there is no communication interface between the first type positioning node and the second type positioning node, so that the quantity of each other cannot be determined between the first type positioning node and the second type positioning node. Therefore, in the embodiments of the present disclosure, the number of the first type positioning node and/or the number of the second type positioning node is reported to the first type positioning node and/or the second type positioning node through the terminal.

In the embodiments of the present disclosure, the number of the first type positioning node is indicated through first quantity information, and the number of the second type positioning node is indicated through second quantity information.

In an example, the terminal reports the number of the second type positioning node to the first type positioning node or the location management function entity, the second quantity information is configured to indicate the number of the second type positioning node, so that the first type positioning node or the location management function entity determine the first quantity information based on the second quantity information, and the first quantity information is configured to indicate the number of the first type positioning node. In an example, a terminal originally needs to perform transmission and measurement for a first positioning signal with H first type positioning nodes to perform positioning measurement, and the quantity N of the second type positioning node is reported to the first type positioning node or the location management function entity by applying the terminal in the examples of the present disclosure. The first type positioning node or the location management function entity may determine the quantity M of the first type positioning node based on H and N, where M+N=H.

The terminal reporting the number of the second type positioning node to the first type positioning node may be understood as reporting to the first type positioning node to which a service cell of the terminal belongs, that is, the first quantity information is determined by the first type positioning node to which a service cell of the terminal belongs.

In another implementation manner, the terminal reports first quantity information to the second type positioning node, and the first quantity information is configured to indicate the number of the first type positioning node, so that the second type positioning node determine second quantity information based on the first quantity information, and the second quantity information is configured to indicate the number of the second type positioning node. In an example, a terminal originally needs to perform transmission and measurement for a first positioning signal with H first type positioning nodes to perform positioning measurement, and the quantity M of the first type positioning node is reported to the second type positioning node by applying the terminal in the examples of the present disclosure. The second type positioning node may determine the quantity N of the second type positioning node based on H and M, where M+N=H. The terminal may report H to the second type positioning node.

Figure 8:
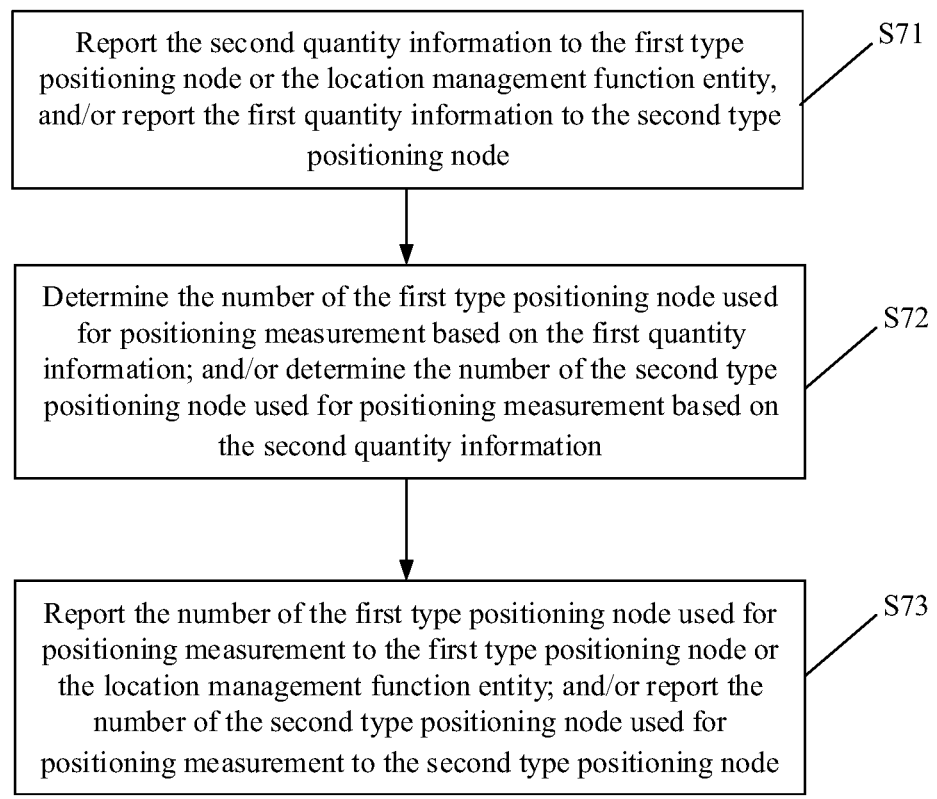
FIG. 8 is a flowchart of a positioning measurement method according to an example.

FIG. 8 is a flowchart of a positioning measurement method according to an example, and as shown in FIG. 8, the positioning measurement method is performed by a terminal, and includes the following steps.

In step S71, the second quantity information is reported to the first type positioning node or the location management function entity, and/or the first quantity information is reported to the second type positioning node.

The first quantity information is configured to indicate the number of the first type positioning node, and/or the second quantity information is configured to indicate the number of the second type positioning node. The first quantity information is determined based on the second quantity information. And/or the second quantity information is determined based on the first quantity information.

It may be understood that, the determination manners for the first quantity information and/or the second quantity information in the embodiments of the present disclosure are not limited to the above manners, and there may be other manners. In an example, the first quantity information is determined by the number of the first type positioning node communicating with the terminal, or is predefined by the first type positioning node or the location management function entity. And/or the second quantity information in the examples of the present disclosure may also be determined by the quantity which is actually detected by the terminal, of the second type positioning node.

In step S72, the number of the first type positioning node used for positioning measurement is determined based on the first quantity information; and/or the number of the second type positioning node used for positioning measurement is determined based on the second quantity information.

In an example of the embodiments of the present disclosure, the number of the first type positioning node used by the terminal for positioning measurement is a quantity indicated by the first quantity information, and/or the number of the second type positioning node used by the terminal for positioning measurement is a quantity indicated by the second quantity information. In another implementation manner, the terminal may determine the number of the first type positioning node used for positioning measurement based on the first quantity information, where the number of the first type positioning node used for positioning measurement is less than or equal to the quantity indicated by the first quantity information. And/or, the number of the second type positioning node used for positioning measurement is determined based on the second quantity information, where the number of the second type positioning node used for positioning measurement is less than or equal to the quantity indicated by the second quantity information.

In step S73, the number of the first type positioning node used for positioning measurement is reported to the first type positioning node or the location management function entity; and/or the number of the second type positioning node used for positioning measurement is reported to the second type positioning node.

In the embodiments of the present disclosure, after determining the number of the first type positioning node which are actually used based on the first quantity information, the terminal may report the number of the first type positioning node used for positioning measurement to the first type positioning node or the location management function entity, so that other first type positioning node which are not selected for positioning measurement are prevented from continuing to send the first positioning signal.

In the embodiments of the present disclosure, after determining the number of the second type positioning node which are actually used based on the second quantity information, the terminal may report the number of the second type positioning node used for positioning measurement to the second type positioning node, so that other second type positioning node which are not selected for positioning measurement are prevented from continuing to send the second positioning signal.

It may be understood that, in the embodiments of the present disclosure, the terminal may report the number of the first type positioning node used for positioning measurement, or report the number of the second type positioning node used for positioning measurement, or report the number of the first type positioning node used for positioning measurement and report the number of the second type positioning node used for positioning measurement.

It may be further understood that, one or more of the above-mentioned steps S71, S72 and S73 in the embodiments of the present disclosure are optional.

In an example, the first quantity information configured to indicate the number of the first type positioning node may be included in the first configuration information. In an example, the second quantity information configured to indicate the number of the second type positioning node may be included in the second configuration information.

Figure 9:
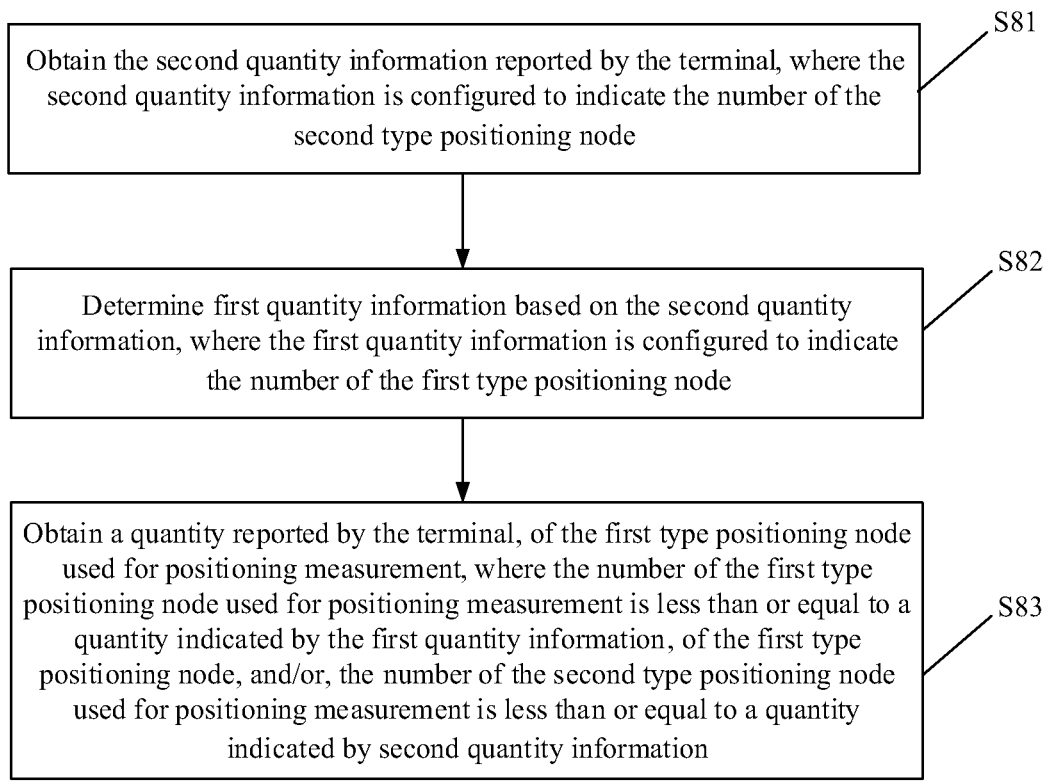
FIG. 9 is a flowchart of a positioning measurement method according to an example.

FIG. 9 is a flowchart of a positioning measurement method shown according to an example. As shown in FIG. 9, the positioning measurement method is performed by network device, the network device may be a first type positioning node or positioning function management entities, the first type positioning node may be the first type positioning node to which a service cell of a terminal belongs, and the positioning measurement method includes the following steps.

In step S81, second quantity information reported by the terminal is obtained, and the second quantity information is configured to indicate the number of the second type positioning node.

In step S82, first quantity information is determined based on the second quantity information, and the first quantity information is configured to indicate the number of the first type positioning node.

In an example, the number of the first type positioning node used by the terminal for positioning measurement is a quantity indicated by the first quantity information, and/or, the number of the second type positioning node used by the terminal for positioning measurement is a quantity indicated by the second quantity information.

In step S83, the quantity reported by the terminal, of the first type positioning node used for positioning measurement is obtained. The number of the first type positioning node used for positioning measurement is less than or equal to the quantity indicated by the first quantity information, of the first type positioning node, and/or, the number of the second type positioning node used for positioning measurement is less than or equal to the quantity indicated by second quantity information.

In an example, the first configuration information includes the first quantity information.

In the embodiments of the present disclosure, after the network device obtains the quantity reported by the terminal, of the first type positioning node used for positioning measurement, the first type positioning node which are not used for positioning measurement may stop sending the first positioning signal.

According to the positioning measurement method provided by the embodiments of the present disclosure, positioning measurement may be performed based on the first configuration information and the second configuration information, and positioning measurement performed by combining the first type positioning node with the second type positioning node is realized, so that power consumption influence of positioning measurement performed based on one type of positioning nodes solely is reduced, and communication performance of a communication system is improved.

The above-mentioned positioning measurement method is illustrated below by taking the first type positioning node including base stations/TRPs and the second type positioning node including WLAN terminals as an example in the embodiments of the present disclosure, and the positioning measurement method mainly includes the following examples:

1. The terminal receives first configuration information and second configuration information, where the first configuration information comes from LMF and/or base stations, and is used for configuring transmission and measurement for a first positioning signal (PRSs and/or SRSs) between the terminal and the base stations/TRPs (possibly M base stations/TRPs). The second configuration information comes from WLAN terminals, and is used for configuring transmission and measurement for a second positioning signal (beacon of WLAN) between the terminal and the WLAN terminals (possibly N WLAN terminals).

2. The terminal transmits and measures the first positioning signal and the second positioning signal according to the first configuration information and the second configuration information, where the measurement includes at least one of signal intensity measurement, time measurement or angle measurement.

3. The terminal obtains a first measurement result with the base stations/TRPs, and obtains a second measurement result with the WLAN terminals.

4. A location of the terminal is calculated.

i. If the terminal calculates the location of the terminal, the first configuration information further needs to include location information of the base stations/TRPs, and the second configuration information further needs to include location information of the WLAN terminals. The terminal calculates the location of the terminal based on the first measurement result, the second measurement result, the location information of the base stations/TRPs, and the location information of the WLAN terminals.

ii. If the base stations or the LMF calculates the location of the terminal, the second configuration information further needs to include the location information of the WLAN terminals. The terminal reports the first measurement result, the second measurement result, and the location information of the WLAN terminals to the base stations or the LMF, and the base stations or the LMF calculates the location of the terminal. If the LMF calculates the location of the terminal, the base stations further need to report positions of the base stations to the LMF. Further, the base stations or the LMF may further feed back the calculated location of the terminal to the terminal.

iii. If the WLAN terminals calculate the location of the terminal, the first configuration information further needs to include location information of the base stations/TRPs. The terminal reports the first measurement result, the second measurement result, and the location information of the base stations/TRPs to the WLAN terminals, and the WLAN terminals calculate the location of the terminal. Further, the WLAN terminals may further feedback the calculated location of the terminal to the terminal.

5. For M and N in M base stations/TRPs and N WLAN terminals which are used for positioning measurement, the following processing methods are required, since there is no interface between a cellular network and the WLAN terminals, the base stations/TRPs and the WLAN terminals do not know the values of M and N, so that the following methods are used for processing:

i. Method 1: the terminal reports the value of N to the base stations and/or the LMF, and the base stations and/or the LMF adjusts the value of M according to the value of N to optimize performance of the cellular network.

ii. Method 2: the terminal reports the value of M to the WLAN terminals, and the WLAN terminals adjust the value of N according to the value of M.

iii. Method 3: the base stations and/or the LMF firstly indicates M with N as 0, and the WLAN terminals indicate N with M as 0. After receiving M and N, the terminal determines the base stations/TRPs and the WLAN terminals which are actually used. For example, the terminal finally selects X base stations/TRPs from the M base stations/TRPs to perform transmission and measurement for reference signals for a positioning purpose, and selects Y WLAN terminals from the N WLAN terminals to perform transmission and measurement for reference signals for the positioning purpose. Certainly, the finally obtained measurement results and the reported measurement results are also with regard to the X base stations/TRPs, and/or the Y WLAN terminals.

Further, the terminal may further report the selected X base stations/TRPs to the base stations and/or the LMF. If the terminal does not report, the other base stations/TRPs which are not selected may continue to send the PRSs.

Based on the same concept, the embodiments of the present disclosure further provide a positioning measurement apparatus.

It may be understood that, in order to realize the above functions, the positioning measurement apparatus provided by the examples of the present disclosure includes corresponding hardware structures and/or software modules for executing the functions. In combination with units and algorithmic steps of each example disclosed in the examples of the present disclosure, the examples of the present disclosure can be realized in the form of hardware or a combination of hardware and computer software. Whether a function is executed by means of hardware or computer software driving hardware depends on specific applications and design constraints of the technical solution. Those skilled in the art may use different methods for each specific application to realize the described functions, but such realization should not be considered beyond the scope of the technical solution of the examples of the present disclosure.

Figure 10:
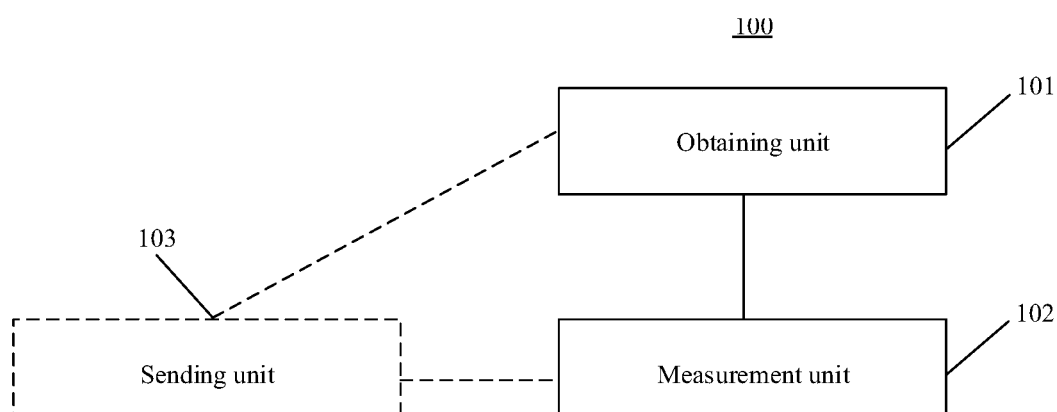
FIG. 10 is a block diagram of a positioning measurement apparatus according to an example.

FIG. 10 is a block diagram of a positioning measurement apparatus according to an example. Referring to FIG. 10, the positioning measurement apparatus 100 is applied to a terminal, and includes an obtaining unit 101 and a measurement unit 102.

The obtaining unit 101 is used for obtaining first configuration information and second configuration information, where the first configuration information is configured to indicate the terminal to perform positioning measurement based on a first positioning signal transmitted between the terminal and a first type positioning node, and the second configuration information is configured to indicate the terminal to perform positioning measurement based on a second positioning signal transmitted between the terminal and a second type positioning node. The measurement unit 102 is used for performing positioning measurement based on the first configuration information and the second configuration information.

In an example, the measurement unit 102 is further used for: determining a first measurement result and a second measurement result, where the first measurement result corresponds to a measurement result obtained by measuring with regard to the first positioning signal, and the second measurement result corresponds to a measurement result obtained by measuring with regard to the second positioning signal. The measurement result includes at least one of a signal intensity measurement result, a time measurement result or an angle measurement result.

In an example, the first configuration information includes location information of the first type positioning node, and the second configuration information includes location information of the second type positioning node. The measurement unit 102 is used for: determining a location of the terminal based on the first measurement result, the second measurement result, the location information of the first type positioning node, and the location information of the second type positioning node.

In an example, the second configuration information includes location information of the second type positioning node, the positioning measurement apparatus 100 further includes a sending unit 103, and the sending unit 103 is used for: sending the first measurement result, the second measurement result, and the location information of the second type positioning node to the first type positioning node or a location management function entity.

In an example, the obtaining unit 101 is further used for: obtaining terminal location information sent by the first type positioning node or the location management function entity, where the terminal location information is determined by the first type positioning node or the location management function entity based on the first measurement result, the second measurement result, the location information of the first type positioning node, and the location information of the second type positioning node.

In an example, the first configuration information includes location information of the first type positioning node, the positioning measurement apparatus 100 further includes a sending unit 103, and the sending unit 103 is used for: sending the first measurement result, the second measurement result, and the location information of the first type positioning node to the second type positioning node.

In an example, the obtaining unit 101 is further used for: obtaining terminal location information sent by the second type positioning node, where the terminal location information is determined by the second type positioning node based on the first measurement result, the second measurement result, the location information of the first type positioning node, and the location information of the second type positioning node.

In an example, the positioning measurement apparatus 100 further includes a sending unit 103, and the sending unit 103 is used for reporting second quantity information to the first type positioning node or the location management function entity, and the second quantity information is configured to indicate the number of the second type positioning node. First quantity information is determined based on the second quantity information, and the first quantity information is configured to indicate the number of the first type positioning node.

In an example, the positioning measurement apparatus 100 further includes a sending unit 103, and the sending unit 103 is used for: reporting first quantity information to the second type positioning node, and the first quantity information is configured to indicate the number of the first type positioning node. Second quantity information is determined based on the first quantity information, and the second quantity information is configured to indicate the number of the second type positioning node.

In an example, the number of the first type positioning node used by the terminal for positioning measurement is a quantity indicated by the first quantity information, and/or, the number of the second type positioning node used by the terminal for positioning measurement is a quantity indicated by the second quantity information.

In an example, the measurement unit 102 is further used for: determining the number of the first type positioning node used for positioning measurement based on the first quantity information, where the number of the first type positioning node used for positioning measurement is less than or equal to the quantity indicated by the first quantity information. And/or, the number of the second type positioning node used for positioning measurement is determined based on the second quantity information, where the number of the second type positioning node used for positioning measurement is less than or equal to the quantity indicated by the second quantity information.

In an example, the positioning measurement apparatus 100 further includes a sending unit 103, and the sending unit 103 is used for: reporting the number of the first type positioning node used for positioning measurement to the first type positioning node or the location management function entity. And/or the number of the second type positioning node used for positioning measurement is reported to the second type positioning node.

In an example, the first configuration information includes the first quantity information. And/or the second configuration information includes the second quantity information. In an example, the first configuration information is sent by the first type positioning node or the location management function entity.

In an example, the first type positioning node and the second-type nodes communicate with the terminal respectively by using different wireless access technologies. In an example, the first type positioning node include wireless network device communicating based on a cellular network. The second type positioning node include at least one of wireless local area network device, Bluetooth device or ultra-wide band positioning device.

Figure 11:
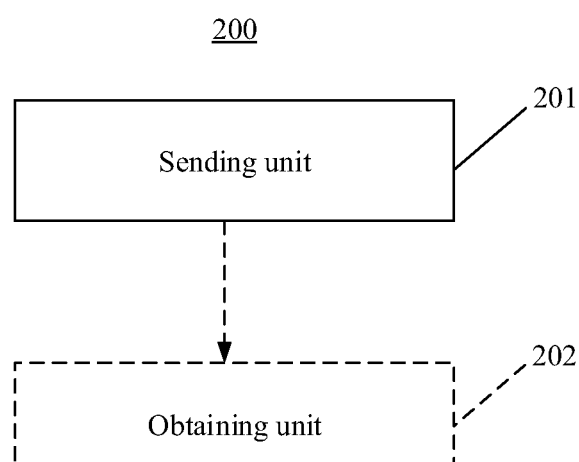
FIG. 11 is a block diagram of a positioning measurement apparatus according to an example.

FIG. 11 is a block diagram of a positioning measurement apparatus according to an example. Referring to FIG. 11, the positioning measurement apparatus 200 is applied to network device, and includes a sending unit 201.

The sending unit 201 is used for sending first configuration information which is configured to indicate a terminal to perform positioning measurement based on a first positioning signal transmitted between the terminal and a first type positioning node, where the number of the first type positioning node is determined based on the number of a second type positioning node, and the second type positioning node are positioning nodes that transmit a second positioning signal with the terminal.

In an example, the positioning measurement apparatus 200 further includes an obtaining unit 202, and the obtaining unit 202 is used for: obtaining the first measurement result, the second measurement result, and the location information of the second type positioning node. A location of the terminal is determined based on the first measurement result, the second measurement result, the location information of the first type positioning node, and the location information of the second type positioning node.

In an example, the network device includes a first type positioning node, the positioning measurement apparatus 200 further includes an obtaining unit 202, and the obtaining unit 202 is used for: obtaining the first measurement result, the second measurement result, and the location information of the second type positioning node. The first measurement result, the second measurement result, the location information of the first type positioning node, and the location information of the second type positioning node are sent to the location management function entity.

In an example, the positioning measurement apparatus 200 further includes an obtaining unit 202, and the obtaining unit 202 is used for: obtaining second quantity information reported by the terminal, where the second quantity information is configured to indicate the number of the second type positioning node. First quantity information is determined based on the second quantity information, and the first quantity information is configured to indicate the number of the first type positioning node.

In an example, the number of the first type positioning node used by the terminal for positioning measurement is a quantity indicated by the first quantity information, and/or, the number of the second type positioning node used by the terminal for positioning measurement is a quantity indicated by the second quantity information.

In an example, the positioning measurement apparatus 200 further includes an obtaining unit 202, and the obtaining unit 202 is used for: obtaining the quantity reported by the terminal, of the first type positioning node used for positioning measurement. The number of the first type positioning node used for positioning measurement is less than or equal to the quantity indicated by the first quantity information, of the first type positioning node, and/or, the number of the second type positioning node used for positioning measurement is less than or equal to the quantity indicated by second quantity information.

In an example, the first configuration information includes the first quantity information. In an example, the first configuration information is sent by the first type positioning node or the location management function entity.

In an example, the first type positioning node and the second-type nodes communicate with the terminal respectively by using different wireless access technologies. In an example, the first type positioning node include wireless network device communicating based on a cellular network. The second type positioning node include at least one of wireless local area network device, Bluetooth device or ultra-wide band positioning device.

With regard to the apparatus in the above embodiments, the specific manners in which various modules perform operations have been described in detail in the embodiments relating to the methods, and details are not described herein.

Figure 12:
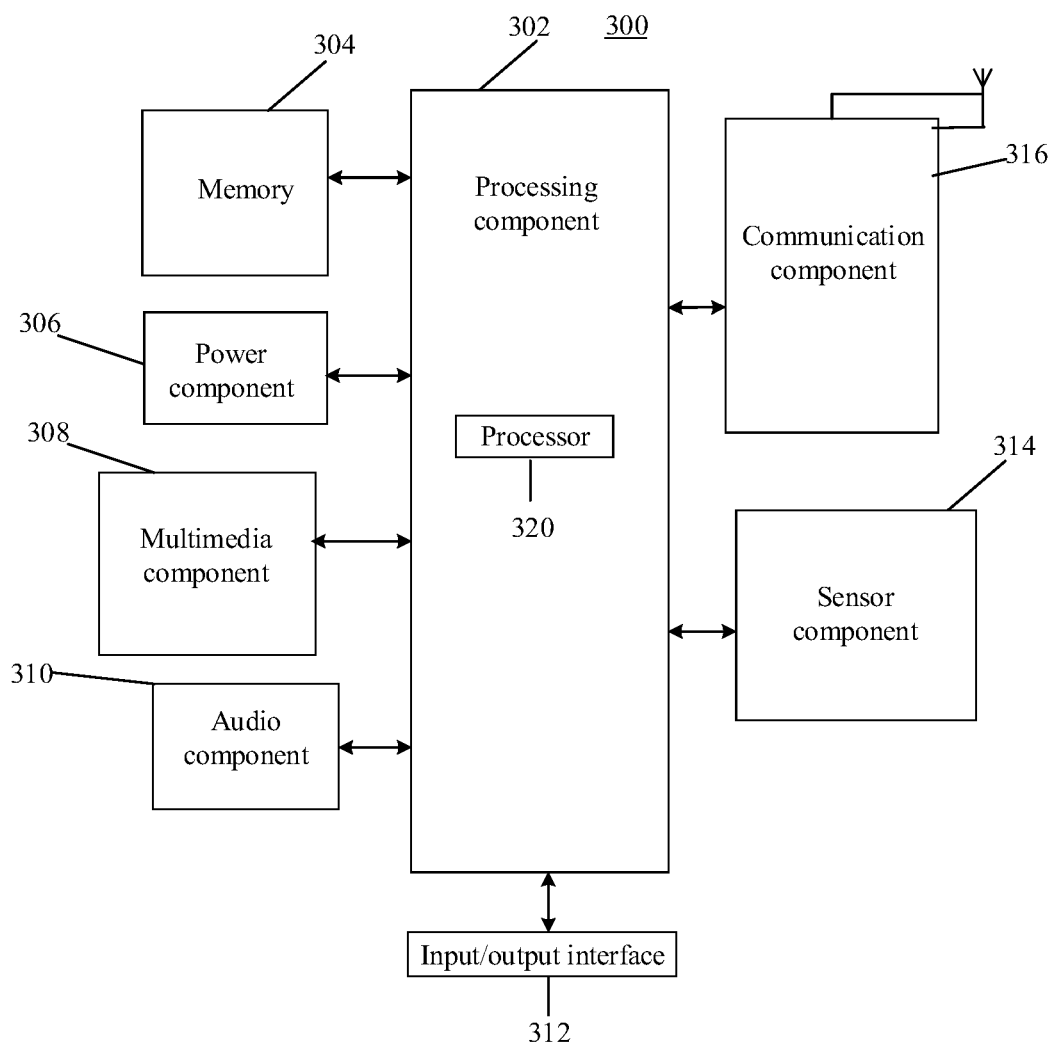
FIG. 12 is a block diagram of an apparatus used for positioning measurement, which is shown according to an example.

FIG. 12 is a block diagram of an apparatus 300 used for positioning measurement, which is shown according to an example; For example, the apparatus 300 may be a mobile phone, a computer, a digital broadcasting terminal, a messaging device, a game console, a tablet device, a medical device, a fitness device, a personal digital assistant, etc.

Referring to FIG. 12, the apparatus 300 may include at least one of the following components: a processing component 302, a memory 304, a power component 306, a multimedia component 308, an audio component 310, an input/output (I/O) interface 312, a sensor component 314, or a communication component 316.

The processing component 302 usually controls the overall operations of the apparatus 300, such as operations associated with display, telephone call, data communication, camera operation and recording operation. The processing component 302 may include one or more processors 320 to execute instructions to complete all of or part of the steps of the above method. In addition, the processing component 302 may include one or more modules to facilitate the interaction between the processing component 302 and other components. For example, the processing component 302 may include a multimedia module to facilitate interaction between the multimedia component 308 and the processing component 302.

The memory 304 is configured to store various types of data to support operations at the apparatus 300. Examples of these data include instructions for any application or method operated on the apparatus 300, contact data, phone book data, messages, pictures, videos, etc. The memory 304 may be implemented by any type of volatile or non-volatile storage device or a combination thereof, such as a static random access memory (SRAM), an electrically erasable programmable read-only memory (EEPROM), an erasable. programmable read-only memory (EPROM), a programmable read-only memory (PROM), a read-only memory (ROM), a magnetic memory, a flash memory, a magnetic disk or an optical disk.

The power component 306 supplies power to various components of the apparatus 300. The power component 306 may include a power management system, one or more power sources, and other components associated with power generation, management and distribution of the apparatus 300.

The multimedia component 308 includes a screen for providing an output interface between the apparatus 300 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, slides and gestures on the touch panel. The touch sensor may sense not only the boundary of the touch or slide, but also the duration and pressure associated with the touch or slide. In some embodiments, the multimedia component 308 includes a front camera and/or a rear camera. When the apparatus 300 is in an operation mode, such as a shooting mode or a video mode, the front camera and/or the rear camera can receive external multimedia data. Each front or rear camera may be a fixed optical lens system or have focal length and optical zoom capability.

The audio component 310 is configured to output and/or input an audio signal. For example, the audio component 310 includes a microphone (MIC), and when the apparatus 300 is in an operation mode, such as a call mode, a recording mode, and a voice recognition mode, the microphone is configured to receive external audio signals. The received audio signals may be further stored in the memory 304 or sent by the communication component 316. In an embodiment, the audio component 310 further includes a speaker for outputting audio signals.

The I/O interface 312 provides an interface between the processing component 302 and a peripheral interface module. The peripheral interface module may be a keyboard, a click wheel, buttons, etc. These buttons may include, but are not limited to a home button, a volume button, a start button, and a lock button.

The sensor component 314 includes one or more sensors for providing various aspects of status assessment for the apparatus 300. For example, the sensor component 314 may detect the on/off state of the apparatus 300, and relative positions of components such as a display and a keypad of the apparatus 300. The sensor component 314 may further detect a position change of the apparatus 300 or one component of the apparatus 300, presence or absence of contact between the user and the apparatus 300, an orientation or acceleration/deceleration of the apparatus 300 and a temperature change of the apparatus 300. The sensor component 314 may include a proximity sensor configured to detect the presence of nearby objects without any physical contact. The sensor component 314 may further include an optical sensor, such as a CMOS or CCD image sensor, for use in imaging applications. In an embodiment, the sensor component 314 may further include an acceleration sensor, a gyroscope sensor, a magnetic sensor, a pressure sensor or a temperature sensor.

The communication component 316 is configured to facilitate wired or wireless communication between the apparatus 300 and other devices. The apparatus 300 may access a wireless network based on communication standards, such as WiFi, 2G or 3G, or a combination thereof. In an exemplary example, the communication component 316 receives broadcast signals or broadcast associated information from an external broadcast management system via a broadcast channel. In an example, the communication component 316 further includes a near field communication (NFC) module to facilitate short-range communication. For example, the NFC module may be implemented based on a radio frequency identification (RFID) technology, an infrared data association (IrDA) technology, an ultra-wide band (UWB) technology, a Bluetooth (BT) technology, and other technologies.

In an example, the apparatus 300 may be implemented the above method by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronic elements.

In an example, a non-transitory computer-readable storage medium including instructions is further provided, such as a memory 304 including instructions executable by the processor 320 of the apparatus 300 to complete the above method. For example, the non-transitory computer-readable storage medium may be an ROM, a random access memory (RAM), a CD-ROM, a magnetic tape, a floppy disk, an optical data storage device, etc.

Figure 13:
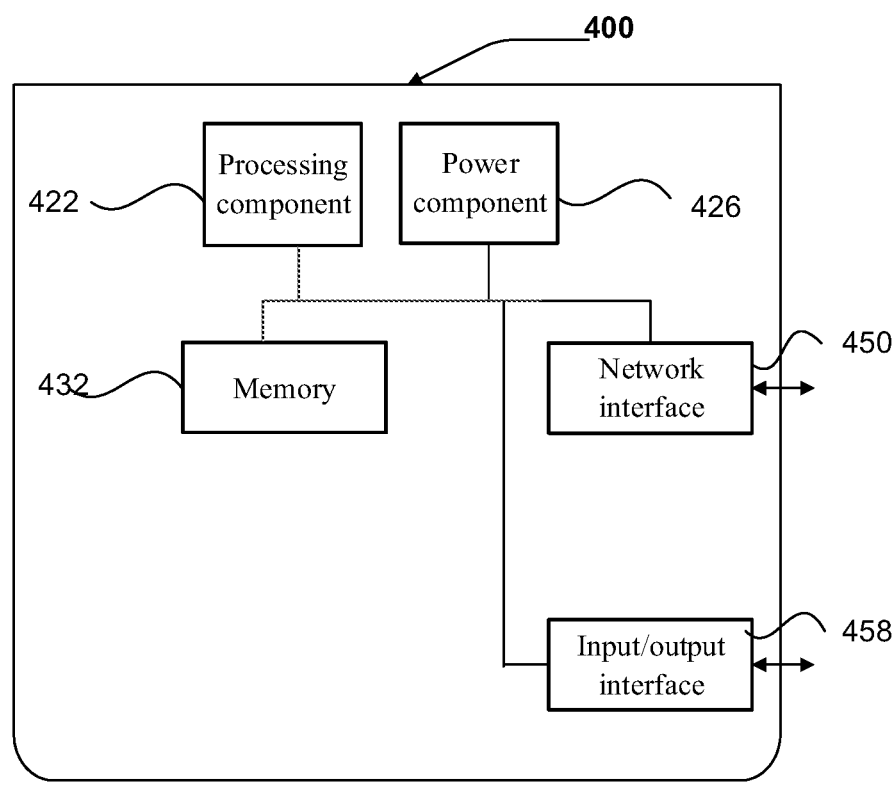
FIG. 13 is a block diagram of an apparatus used for positioning measurement, which is shown according to an example.

FIG. 13 is a block diagram of an apparatus 400 used for positioning measurement, which is shown according to an example; For example, the apparatus 400 may be provided as network device, such as a base station or the like. Referring to FIG. 13, the apparatus 400 includes a processing component 422, and further includes one or more processors, and a memory resource represented by the memory 432 and used for storing instructions capable of being executed by the processing component 422, such as application programs. The applications stored in the memory 432 may include one or more modules each corresponding to a set of instructions. In addition, the processing component 422 is configured to execute instructions to execute the above method.

The apparatus 400 may further include a power component 426 configured to execute power supply management on the apparatus 400, a wired or wireless network interface 450 configured to connect the apparatus 400 to a network, and an input/output (I/O) interface 458. The apparatus 400 may operate an operation system stored in the memory 432, such as Windows Server™, Mac OS X™, Unix™, Unix™, FreeBSD™ or the like.

In the examples, a non-transitory computer-readable storage medium including instructions is further provided, such as a memory 432 including instructions, and the instructions may be executed by the processing component 422 of the apparatus 400 to complete the above method. For example, the non-transitory computer-readable storage medium may be an ROM, a random access memory (RAM), a CD-ROM, a magnetic tape, a floppy disk, an optical data storage device, etc.

It can be further understood that "multiple" in the present disclosure refers to two or more than two, and that other quantifiers are similar. "And/or", which describes the association relationship of associated objects, indicates that three relationships can exist, for example, A and/or B, which can indicate the following three cases: A alone, both A and B, and B alone. The character "/" generally indicates an "or" relationship between former and later associated objects. Singular forms "a", "said" and "the" are also intended to include most forms, unless the context clearly indicates otherwise.

It is further understood that terms "first", "second", etc. are used to describe a variety of information, but such information should not be limited to these terms. These terms are used only to distinguish the same type of information from one another and do not indicate a particular order or level of importance. In fact, expressions "first" and "second" can be used interchangeably. For example, without departing from the scope of the disclosure, the first information may also be referred to as second information, and similarly, the second information may also be referred to as first information.

It may further be understood that, in the examples of the present disclosure, although the operations are described in a particular order in the figures, it should not be understood as requiring that these operations are executed in the particular order shown or in a serial order, or requiring that all the operations shown are executed to obtain desired results. In a specific environment, multitasking and parallel processing may be advantageous.

Those skilled in the art can readily conceive of other examples of the disclosure upon consideration of the specification and practice of the disclosure. The disclosure is intended to cover any variations, uses, or adaptive changes of the disclosure, and these variations, uses, or adaptive changes follow general principles of the disclosure and include common general knowledge or customary technical means in the technical field not disclosed in the disclosure. The specification and examples are considered as illustrative merely, and a true scope and spirit of the disclosure are indicated by the following claims.

It is to be understood that the disclosure is not limited to the precise structure that has been described above and shown in the accompanying drawings and can be modified and altered in various ways without departing from its scope. The scope of the disclosure is limited only by the appended claims.

According to a first aspect of embodiments of the present disclosure, a positioning measurement method is provided and performed by a terminal, and includes: obtaining first configuration information and second configuration information, where the first configuration information is configured to indicate the terminal to perform positioning measurement based on a first positioning signal transmitted between the terminal and a first type positioning node, and the second configuration information is configured to indicate the terminal to perform positioning measurement based on a second positioning signal transmitted between the terminal and a second type positioning node; and performing positioning measurement based on the first configuration information and the second configuration information.

In an example, the positioning measurement method further includes: determining a first measurement result and a second measurement result, where the first measurement result corresponds to a measurement result obtained by measuring with regard to the first positioning signal, and the second measurement result corresponds to a measurement result obtained by measuring with regard to the second positioning signal; and each measurement result includes at least one of a signal intensity measurement result, a time measurement result or an angle measurement result.

In an example, the first configuration information includes location information of the first type positioning node, and the second configuration information includes location information of the second type positioning node; and the performing positioning measurement based on the first configuration information and the second configuration information includes: determining a location of the terminal based on the first measurement result, the second measurement result, the location information of the first type positioning node, and the location information of the second type positioning node.

In an example, the second configuration information includes location information of the second type positioning node, and the positioning measurement method further includes: sending the first measurement result, the second measurement result, and the location information of the second type positioning node to the first type positioning node or a location management function entity.

In an example, the positioning measurement method further includes: obtaining terminal location information sent by the first type positioning node or the location management function entity, where the terminal location information is determined by the first type positioning node or the location management function entity based on the first measurement result, the second measurement result, the location information of the first type positioning node, and the location information of the second type positioning node.

In an example, the first configuration information includes location information of the first type positioning node, and the positioning measurement method further includes: sending the first measurement result, the second measurement result, and the location information of the first type positioning node to the second type positioning node.

In an example, the positioning measurement method further includes: obtaining terminal location information sent by the second type positioning node, where the terminal location information is determined by the second type positioning node based on the first measurement result, the second measurement result, the location information of the first type positioning node, and the location information of the second type positioning node.

In an example, the positioning measurement method further includes: reporting second quantity information to the first type positioning node or the location management function entity, the second quantity information being configured to indicate the number of the second type positioning node; and determining first quantity information based on the second quantity information, the first quantity information is configured to indicate the number of the first type positioning node.

In an example, the positioning measurement method further includes: reporting first quantity information to the second type positioning node, the first quantity information being configured to indicate the number of the first type positioning node; and determining second quantity information based on the first quantity information, the second quantity information is configured to indicate the number of the second type positioning node.

In an example, the number of the first type positioning node used by the terminal for positioning measurement is a quantity indicated by the first quantity information, and/or the number of the second type positioning node used by the terminal for positioning measurement is a quantity indicated by the second quantity information.

In an example, the positioning measurement method further includes: determining the number of the first type positioning node for positioning measurement based on the first quantity information, where the number of the first type positioning node for positioning measurement is less than or equal to a quantity indicated by the first quantity information; and/or determining the number of the second type positioning node for positioning measurement based on the second quantity information, where the number of the second type positioning node for positioning measurement is less than or equal to a quantity indicated by the second quantity information.

In an example, the positioning measurement method further includes: reporting the number of the first type positioning node for positioning measurement to the first type positioning node or the location management function entity; and/or reporting the number of the second type positioning node for positioning measurement to the second type positioning node.

In an example, the first configuration information includes the first quantity information; and/or the second configuration information includes the second quantity information.

In an example, the first configuration information is sent by the first type positioning node or the location management function entity.

In an example, the first type positioning node and the second-type nodes communicate with the terminal respectively by using different wireless access technologies.

In an example, the first type positioning node include wireless network device communicating based on a cellular network; and the second type positioning node include at least one of wireless local area network device, Bluetooth device or ultra wide band positioning device.

According to a second aspect of the embodiment of the present disclosure, a positioning measurement method is provided and performed by network device, and includes: sending first configuration information which is configured to indicate a terminal to perform positioning measurement based on a first positioning signal transmitted between the terminal and a first type positioning node, where the number of the first type positioning node is determined based on the number of a second type positioning node, and the second type positioning node are positioning nodes that transmit a second positioning signal with the terminal.

In an example, the positioning measurement method further includes: obtaining a first measurement result, a second measurement result, and location information of the second type positioning node; and determining a location of the terminal based on the first measurement result, the second measurement result, location information of the first type positioning node, and location information of the second type positioning node.

In an example, the network device includes the first type positioning node, and the positioning measurement method further includes: obtaining a first measurement result, a second measurement result, and location information of the second type positioning node; and sending the first measurement result, the second measurement result, the location information of the first type positioning node, and the location information of the second type positioning node to a location management function entity.

In an example, the positioning measurement method further includes: obtaining second quantity information reported by the terminal, where the second quantity information is configured to indicate the number of the second type positioning node; and determining first quantity information based on the second quantity information, and the first quantity information is configured to indicate the number of the first type positioning node.

In an example, the number of the first type positioning node used by the terminal for positioning measurement is a quantity indicated by the first quantity information, and/or, the number of the second type positioning node used by the terminal for positioning measurement is a quantity indicated by the second quantity information.

In an example, the positioning measurement method further includes: obtaining a quantity reported by the terminal, of the first type positioning node for positioning measurement; and the number of the first type positioning node for positioning measurement being less than or equal to a quantity indicated by the first quantity information, of the first type positioning node, and/or, the number of the second type positioning node for positioning measurement being less than or equal to a quantity indicated by the second quantity information.

In an example, the first configuration information includes the first quantity information.

In an example, the first configuration information is sent by the first type positioning node or the location management function entity.

In an example, the first type positioning node and the second-type nodes communicate with the terminal respectively by using different wireless access technologies.

In an example, the first type positioning node include wireless network device communicating based on a cellular network; and the second type positioning node include at least one of wireless local area network device, Bluetooth device or ultra-wide band positioning device.

According to a third aspect of the embodiments of the present disclosure, a positioning measurement apparatus is provided and applied to a terminal, and includes: an obtaining unit, used for obtaining first configuration information and second configuration information, where the first configuration information is configured to indicate the terminal to perform positioning measurement based on a first positioning signal transmitted between the terminal and a first type positioning node, and the second configuration information is configured to indicate the terminal to perform positioning measurement based on a second positioning signal transmitted between the terminal and a second type positioning node; and a measurement unit, used for performing positioning measurement based on the first configuration information and the second configuration information.

In an example, the measurement unit is further used for: determining a first measurement result and a second measurement result, where the first measurement result corresponds to a measurement result obtained by measuring with regard to the first positioning signal, and the second measurement result corresponds to a measurement result obtained by measuring with regard to the second positioning signal; and each measurement result includes at least one of a signal intensity measurement result, a time measurement result or an angle measurement result.

In an example, the first configuration information includes location information of the first type positioning node, and the second configuration information includes location information of the second type positioning node. The measurement unit is used for: determining a location of the terminal based on the first measurement result, the second measurement result, the location information of the first type positioning node, and the location information of the second type positioning node.

In an example, the second configuration information includes location information of the second type positioning node, the positioning measurement apparatus further includes a sending unit, and the sending unit is used for: sending the first measurement result, the second measurement result, and the location information of the second type positioning node to the first type positioning node or a location management function entity.

In an example, the obtaining unit is further used for: obtaining terminal location information sent by the first type positioning node or the location management function entity, where the terminal location information is determined by the first type positioning node or the location management function entity based on the first measurement result, the second measurement result, the location information of the first type positioning node, and the location information of the second type positioning node.

In an example, the first configuration information includes location information of the first type positioning node, the positioning measurement apparatus further includes a sending unit, and the sending unit is used for: sending the first measurement result, the second measurement result, and the location information of the first type positioning node to the second type positioning node.

In an example, the obtaining unit is further used for: obtaining terminal location information sent by the second type positioning node, where the terminal location information is determined by the second type positioning node based on the first measurement result, the second measurement result, the location information of the first type positioning node, and the location information of the second type positioning node.

In an example, the positioning measurement apparatus further includes a sending unit, and the sending unit is used for: reporting second quantity information to the first type positioning node or the location management function entity, and the second quantity information being configured to indicate the number of the second type positioning node; where first quantity information is determined based on the second quantity information, and the first quantity information is configured to indicate the number of the first type positioning node.

In an example, the positioning measurement apparatus further includes a sending unit, and the sending unit is used for: reporting first quantity information to the second type positioning node, and the first quantity information is configured to indicate the number of the first type positioning node; where second quantity information is determined based on the first quantity information, and the second quantity information is configured to indicate the number of the second type positioning node.

In an example, the number of the first type positioning node used by the terminal for positioning measurement is a quantity indicated by the first quantity information, and/or the number of the second type positioning node used by the terminal for positioning measurement is a quantity indicated by the second quantity information.

In an example, the measurement unit is further used for: determining the number of the first type positioning node used for positioning measurement based on the first quantity information, where the number of the first type positioning node used for positioning measurement is less than or equal to a quantity indicated by the first quantity information; and/or determining the number of the second type positioning node used for positioning measurement based on the second quantity information, where the number of the second type positioning node used for positioning measurement is less than or equal to a quantity indicated by the second quantity information.

In an example, the positioning measurement apparatus further includes a sending unit, and the sending unit is used for: reporting the number of the first type positioning node used for positioning measurement to the first type positioning node or the location management function entity; and/or reporting the number of the second type positioning node used for positioning measurement to the second type positioning node.

In an example, the first configuration information includes the first quantity information; and/or the second configuration information includes the second quantity information.

In an example, the first configuration information is sent by the first type positioning node or the location management function entity.

In an example, the first type positioning node and the second-type nodes communicate with the terminal respectively by using different wireless access technologies.

In an example, the first type positioning node include wireless network device communicating based on a cellular network; and the second type positioning node include at least one of wireless local area network device, Bluetooth device or ultra-wide band positioning device.

According to a fourth aspect of the examples of the present disclosure, a positioning measurement apparatus is provided and applied to network device, and includes: a sending unit, used for sending first configuration information which is configured to indicate a terminal to perform positioning measurement based on a first positioning signal transmitted between the terminal and a first type positioning node, where the number of the first type positioning node is determined based on the number of a second type positioning node, and the second type positioning node are positioning nodes that transmit a second positioning signal with the terminal.

In an example, the positioning measurement apparatus further includes an obtaining unit, and the obtaining unit is used for:

obtaining a first measurement result, a second measurement result, and location information of the second type positioning node; and determining a location of the terminal based on the first measurement result, the second measurement result, location information of the first type positioning node, and location information of the second type positioning node.

In an example, the network device includes the first type positioning node, the positioning measurement apparatus further includes an obtaining unit, and the obtaining unit is used for: obtaining a first measurement result, a second measurement result, and location information of the second type positioning node; and the first measurement result, the second measurement result, the location information of the first type positioning node, and the location information of the second type positioning node are sent to a location management function entity.

In an example, the positioning measurement apparatus further includes an obtaining unit, and the obtaining unit is used for: obtaining second quantity information reported by the terminal, where the second quantity information is configured to indicate the number of the second type positioning node; and determining first quantity information based on the second quantity information, and the first quantity information is configured to indicate the number of the first type positioning node.

In an example, the number of the first type positioning node used by the terminal for positioning measurement is a quantity indicated by the first quantity information, and/or, the number of the second type positioning node used by the terminal for positioning measurement is a quantity indicated by the second quantity information.

In an example, the positioning measurement apparatus further includes an obtaining unit, and the obtaining unit is used for: obtaining a quantity reported by the terminal, of the first type positioning node used for positioning measurement; and the number of the first type positioning node used for positioning measurement is less than or equal to a quantity indicated by the first quantity information, of the first type positioning node; and/or, the number of the second type positioning node used for positioning measurement is less than or equal to a quantity indicated by second quantity information.

In an example, the first configuration information includes the first quantity information.

In an example, the first configuration information is sent by the first type positioning node or the location management function entity.

In an example, the first type positioning node and the second-type nodes communicate with the terminal respectively by using different wireless access technologies.

In an example, the first type positioning node include wireless network device communicating based on a cellular network; and the second type positioning node include at least one of wireless local area network device, Bluetooth device or ultra wide band positioning device.

According to a fifth aspect of the examples of the present disclosure, a positioning measurement apparatus is provided, and includes: a processor; and a memory for storing processor-executable instructions. The processor is configured to: execute the positioning measurement method in the first aspect or in any implementation manner of the first aspect.

According to a sixth aspect of the examples of the present disclosure, a positioning measurement apparatus is provided, and includes: a processor; and a memory for storing processor-executable instructions. The processor is configured to: execute the positioning measurement method in the second aspect or in any implementation manner of the second aspect.

According to a seventh aspect of the examples of the present disclosure, a non-transitory computer-readable storage medium is provided, and when instructions in the storage medium are executed by the processor of a mobile terminal, the mobile terminal can execute the positioning measurement method in the first aspect or in any implementation manner of the first aspect.

According to an eighth aspect of the examples of the present disclosure, a non-transitory computer-readable storage medium is provided, and when instructions in the storage medium are executed by the processor of network device, the network device can execute the positioning measurement method in the second aspect or in any implementation manner of the second aspect.

The technical solution provided by the examples of the present disclosure may include the following beneficial effects: positioning measurement is performed based on the first configuration information and the second configuration information, and positioning measurement performed by combining the first type positioning node with the second type positioning node is realized, so that power consumption influence of positioning measurement performed based on one type of positioning nodes solely is reduced, and communication performance of a communication system is improved.

What is claimed is:

1. A positioning measurement method, performed by a terminal, and comprising:
    obtaining first configuration information and second configuration information, wherein the first configuration information is configured to indicate the terminal to perform positioning measurement based on a first positioning signal transmitted between the terminal and a first type positioning node, and the second configuration information is configured to indicate the terminal to perform positioning measurement based on a second positioning signal transmitted between the terminal and a second type positioning node; and
    performing positioning measurement based on the first configuration information and the second configuration information.

2. The positioning measurement method according to claim 1, further comprising:
    determining a first measurement result and a second measurement result, wherein the first measurement result corresponds to a measurement result obtained by measuring the first positioning signal, and the second measurement result corresponds to a measurement result obtained by measuring with regard to the second positioning signal; and
    the measurement result comprises at least one of a signal intensity measurement result, a time measurement result or an angle measurement result.

3. The positioning measurement method according to claim 2, wherein the first configuration information comprises location information of the first type positioning node, and the second configuration information comprises location information of the second type positioning node;
    performing positioning measurement based on the first configuration information and the second configuration information comprises:
    determining a location of the terminal based on the first measurement result, the second measurement result, the location information of the first type positioning node, and the location information of the second type positioning node.

4. The positioning measurement method according to claim 2, wherein the second configuration information comprises location information of the second type positioning node, and the method further comprises:
    sending the first measurement result, the second measurement result, and the location information of the second type positioning node to the first type positioning node or a location management function.

5. The positioning measurement method according to claim 4, further comprising:
    obtaining terminal location information sent by the first type positioning node or the location management function entity, wherein the terminal location information is determined by the first type positioning node or the location management function entity based on the first measurement result, the second measurement result, the location information of the first type positioning node, and the location information of the second type positioning node.

6. The positioning measurement method according to claim 2, wherein the first configuration information comprises location information of the first type positioning node, and the method further comprises:
    sending the first measurement result, the second measurement result, and the location information of the first type positioning node to the second type positioning node.

7. The positioning measurement method according to claim 6, further comprising:
    obtaining terminal location information sent by the second type positioning node, wherein the terminal location information is determined by the second type positioning node based on the first measurement result, the second measurement result, the location information of the first type positioning node, and the location information of the second type positioning node.

8. The positioning measurement method according to claim 1, further comprising:
    reporting second quantity information to the first type positioning node or the location management function,
    determining first quantity information based on the second quantity information; or
    reporting the first quantity information to the second type positioning node, determining the second quantity information based on the first quantity information;
    wherein, the first quantity information is configured to indicate the number of the first type positioning node, the second quantity information is configured to indicate the number of the second type positioning node.

9. The positioning measurement method according to claim 8, the method further comprises at least one of:
    determining the number of the first type positioning node for positioning measurement based on the first quantity information, wherein the number of the first type positioning node for positioning measurement is less than or equal to a quantity indicated by the first quantity information; or
    determining the number of the second type positioning node for positioning measurement based on the second quantity information, wherein the number of the second type positioning node for positioning measurement is less than or equal to a quantity indicated by the second quantity information.

10. The positioning measurement method according to claim 9, the method further comprises at least one of:
    reporting the number of the first type positioning node for positioning measurement to the first type positioning node or the location management function entity; or
    reporting the number of the second type positioning node for positioning measurement to the second type positioning node.

11. The positioning measurement method according to claim 8, wherein the first configuration information comprises the first quantity information; and/or the second configuration information comprises the second quantity information.

12. The positioning measurement method according to claim 1, wherein the first configuration information is sent by the first type positioning node or the location management function entity.

13. The positioning measurement method according to claim 1, wherein the first type positioning node and the second-type nodes communicate with the terminal respectively by using different wireless access technologies;
wherein the first type positioning node comprise wireless network device communicating based on a cellular network; and the second type positioning node comprise at least one of wireless local area network device, Bluetooth device or ultra wide band positioning device.

14. A positioning measurement method, performed by network device, and comprising:
sending first configuration information which is configured to indicate a terminal to perform positioning measurement based on a first positioning signal transmitted between the terminal and a first type positioning node, where the number of the first type positioning node is determined based on the number of a second type positioning node, and the second type positioning node are positioning nodes that transmit a second positioning signal with the terminal.

15. The positioning measurement method according to claim 14, further comprising:
obtaining a first measurement result, a second measurement result, and location information of the second type positioning node; and
determining a location of the terminal based on the first measurement result, the second measurement result, location information of the first type positioning node, and location information of the second type positioning node.

16. The positioning measurement method according to claim 14, wherein the network device comprises the first type positioning node, and the method further comprises:
obtaining a first measurement result, a second measurement result, and location information of the second type positioning node; and
sending the first measurement result, the second measurement result, the location information of the first type positioning node, and the location information of the second type positioning node to a location management function entity.

17. The positioning measurement method according to claim 14, further comprising:
obtaining second quantity information reported by the terminal, wherein the second quantity information is configured to indicate the number of the second type positioning node; and
determining first quantity information based on the second quantity information, wherein the first quantity information is configured to indicate the number of the first type positioning node.

18. The positioning measurement method according to claim 14, further comprising:
obtaining a quantity reported by the terminal, of the first type positioning node for positioning measurement; and
the number of the first type positioning node for positioning measurement being less than or equal to a quantity indicated by the first quantity information, of the first type positioning node, and/or, the number of the second type positioning node for positioning measurement being less than or equal to a quantity indicated by second quantity information.

19. A positioning measurement apparatus, comprising:
a processor, and
a memory used for storing instructions capable of being executed by the processor,
wherein the processor is configured to: execute the positioning measurement method according to claim 14.

20. A positioning measurement apparatus, comprising:
a processor, and
a memory used for storing instructions capable of being executed by the processor,
wherein the processor is configured to:
obtain first configuration information and second configuration information, wherein the first configuration information is configured to indicate the terminal to perform positioning measurement based on a first positioning signal transmitted between the terminal and a first type positioning node, and the second configuration information is configured to indicate the terminal to perform positioning measurement based on a second positioning signal transmitted between the terminal and a second type positioning node; and
perform positioning measurement based on the first configuration information and the second configuration information.

* * * * *

UNITED STATES PATENT AND TRADEMARK OFFICE
CERTIFICATE OF CORRECTION

| | | |
|---|---|---|
| PATENT NO. | : 12,382,421 B2 | Page 1 of 1 |
| APPLICATION NO. | : 18/012117 | |
| DATED | : August 5, 2025 | |
| INVENTOR(S) | : Mingju Li | |

It is certified that error appears in the above-identified patent and that said Letters Patent is hereby corrected as shown below:

In the Specification
In Column 2 Line 31, delete "example;" and insert -- example. --, therefor.
In Column 2 Line 35, delete "to" and insert -- by --, therefor.
In Column 18 Line 27, delete "erasable." and insert -- erasable --, therefor.

Signed and Sealed this
Fourteenth Day of October, 2025

John A. Squires
*Director of the United States Patent and Trademark Office*